No. 805,082. PATENTED NOV. 21, 1905.
L. LIBBMAN.
BREAD MIXER.
APPLICATION FILED JULY 10, 1905.
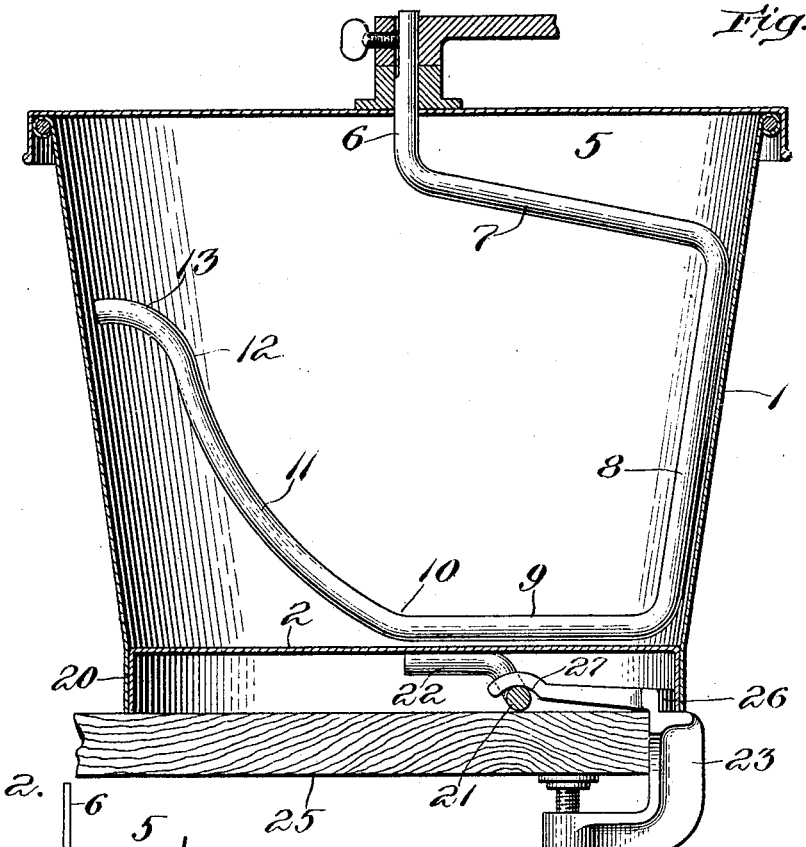
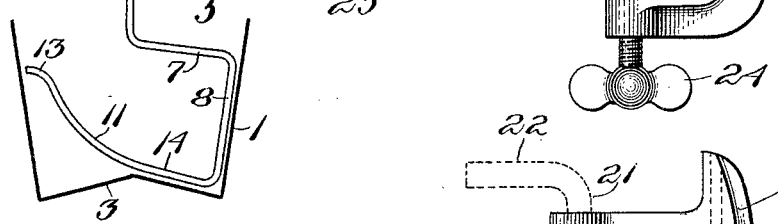
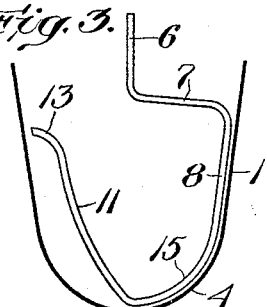
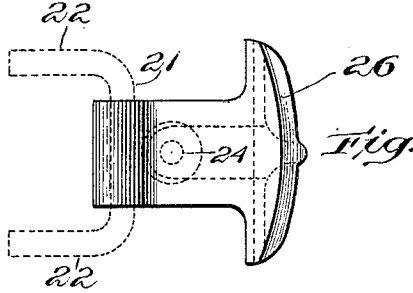
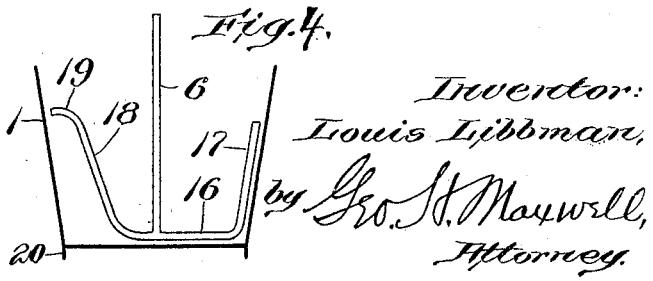
Witnesses:
Arthur F. Randall
M. A. Jones
Inventor:
Louis Libbman,
by Geo. H. Maxwell,
Attorney.

UNITED STATES PATENT OFFICE.

LOUIS LIBBMAN, OF EVERETT, MASSACHUSETTS.

BREAD-MIXER.

No. 805,082.        Specification of Letters Patent.        Patented Nov. 21, 1905.

Application filed July 10, 1905. Serial No. 268,955.

*To all whom it may concern:*

Be it known that I, LOUIS LIBBMAN, a citizen of the United States, residing at Everett, in the county of Suffolk and State of Massachusetts, have invented an Improvement in Bread-Mixers, of which the following description, in connection with the accompanying drawings, is a specification, like numerals on the drawings representing like parts.

My invention is an improvement on the kind of device shown and claimed in my application, Serial No. 260,285, filed May 13, 1905.

One of the principal objects of my present invention is to insure that the dough shall be thoroughly mixed and kneaded and prevented from climbing up on the stirrer and lodging on the pail or receptacle. In other words, I have devised a mechanism which will insure a perfect kneading and blending of every particle of the contained mixture which goes to form the dough.

The mechanical details and further advantages of the present embodiment of my invention will be pointed out more at length in the course of the following description, taken in connection with the accompanying drawings.

In the drawings, Figure 1 is a central vertical sectional view of the preferred embodiment of my invention. Figs. 2, 3, and 4 are similar views of modified constructions, and Fig. 5 is a top plan view of one part of the clamping device.

In carrying out my invention I provide any suitable receptacle 1, being herein shown as a pail having a flat bottom 2, Fig. 1, or conical bottom 3, Fig. 2, or round bottom 4, Fig. 3. Coaxially mounted vertically in the receptacle 1 is a rotary stirrer-rod 5 of special shape, which constitutes the main feature of my invention. This stirrer-rod is arranged to scrape the dough on one side of the pail while it mixes and "kneads" it, more properly speaking, on the other side, the scraping action taking place over a large area of the pail in such a manner as to tend to roll and break the balls or little globules of unmixed flour which are apt to form in the process of making bread or the like. This rolling is kept constantly acting upon the dough at the side and bottom of the pail while the dough is being turned, kneaded, and mixed at the opposite side of the pail by the kneading portion, which serves to bring a constantly new portion of the dough in position for the scraper to act upon it. The scraping portion of the stirrer 5 is intermediate the ends thereof next to the handle or stem portion, thereby giving great strength and rigidity, while the kneading portion is in the form of a hook which projects up in the midst of the pail and is so shaped as to produce a peculiar rolling and tipping action on the dough. In this class of devices a serious objection which has been met with resides in the tendency of the dough to "climb" on the stirrer-rod, and this hook-like formation of the stirrer as herein shown effectually prevents this tendency. Said climbing is due to the yielding character of the dough, which when pressed by the stirrer simply yields and envelops the latter, and as the stirrer proceeds the dough tends to gather gradually into a ball or central mass which raises or is lifted higher on the stirrer as the latter rotates, part of the dough usually gathering more or less permanently on the pail itself and part of the dough remaining in unchanging position on the upper end of the stirrer adjacent the handle and journal-bearing portion of the stirrer. All this is effectually prevented by my invention, as will now be made apparent.

From the stem portion 6 of the stirrer 5 I bend the rod laterally at 7 until it approaches close to the side of the pail, whence it is bent downwardly at 8 parallel to said side and thence laterally at 9 close to and parallel to the bottom 2. The portion 9 terminates at 10 coaxially of the pail in vertical alinement beneath the stem 6 and is thence bent diagonally upward at 11 to occupy the intermediate portion of the pail at a considerable distance from the adjacent side thereof. The result is that the parts 8 and 9 act to scrape the pail and roll the outer portion of the dough between the side of the pail and the rod, thereby breaking all lumps of dough and keeping the mass of dough in a constant condition of change. At the same time the part 11 passes through the body of the mass (as distinguished from the part 8, which scrapes the pail and rolls off a layer from the outside of the mass) and cuts and kneads the mass effectually. At the upper end 12 of the part 11 the stirrer-rod extends outwardly, as shown at 13, close to the side of the pail. This bend 13 constitutes what I term a "dumper" and is preferably curved, as shown, but assumes more or less of a horizontal position for the purpose of inverting or giving a tendency to the mass of dough to tip bottom side up. This will be more apparent when the climbing tendency which I have referred to is borne in mind. As the kneader 11 passes through the yielding mass of dough the latter tends to climb up the inclined part 11 and is given a rolling tendency by the engagement of its outer portion with the stationary side of the pail, and as the mass reaches the terminal bend 13, not being able to climb any higher and being prevented from remaining there by the pressure of the dough behind, it is dumped or caused to roll or tip over in a constantly-falling tendency due to the movement of the approximately horizontal portion 13 with relation to the side of the pail. I have found that this arrangement of stirrer-rod prevents the retention of lumps in the mass of dough and effectually breaks and mixes and kneads every particle of the mass, prevents the lodgment of any portion thereof about the pail or the clinging of any part to the rod, and gives rapid and quick results.

In Fig. 2 the parts 6, 7, and 8 are the same as in Fig. 1; but instead of the horizontal portion 9 the bottom scraper part extends obliquely at 14 close to the conical or inclined surface of the bottom, and from the apex thereof the part 11 extends the same as in Fig. 1.

In Fig. 3 the construction is similar, excepting that instead of a straight lower scraper part, as in Figs. 1 and 2, I provide a curved portion 15, which follows parallel to the round bottom until the center is reached and thence extends upwardly the same as before to constitute the kneader and dumper.

In Fig. 4 I have shown a considerable variation from the previous construction, the stem 6 extending downwardly close to the bottom of the pail, whence the scraper portions thereof are formed as a horizontal part 16 and an oblique part 17, and the kneader portion is formed as a branch 18, terminating, when desired in the dumper 19, as before.

In all the constructions shown, as also that shown in my application Serial No. 260,285, the stirrer-rod terminates below its journal portion in a U-shaped end.

When having so much scraping area, it becomes necessary to clamp the apparatus in unyielding position, and accordingly I provide beneath the bottom and within the rim 20 of the pail a depending bar 21, shown herein as a U-shaped device, whose arms 22 are soldered or otherwise fastened to the bottom of the pail. Coöperating with this bar 21 and with the rim 20 is a clamp 23, provided with a thumb-screw 24, adapted to be clamped against a table or other support 25. The clamp 23 at its outer upper side is cut away to provide a shoulder 26 and has sufficient width, as clearly shown in Fig. 5, to fit against a considerable portion of the curved rim 20. The inner free end of the clamp is curved or grooved on its under side at 27 to fit snugly on the bar 21. The result of this construction is that when the thumb-screw 24 is pressed upwardly the grooved end 27 of the clamp pulls downwardly on the bar 21, while the shoulder 26 tends to lift the adjacent edge 20 of the pail, thereby depressing rigidly and firmly the opposite edge of the pail. I prefer to place the bar 21 not at the middle of the bottom, but at one side, as shown. The groove 27 and shoulder 26 coöperate in giving extreme rigidity of bracing and preventing any possible shifting or unsteadiness of position. This clamp is claimed in a copending divisional application.

As already intimated, my invention is capable of various embodiments, and accordingly I wish it understood that I am not restricted to the precise constructional shapes and details herein set forth.

Having described my invention, what I claim as new, and desire to secure by Letters Patent of the United States, is—

1. A bread-mixer, comprising a receptacle, and a rotary stirrer-rod vertically journaled coaxially of the receptacle, said rod at the lower end of its vertical journal being bent outwardly and thence downwardly parallel and close to the side of the receptacle for constituting a side-scraper, and thence from the lower end of the latter extending inwardly toward the center parallel and close to the bottom to constitute a bottom-scrapper, and thence extending upwardly in that side of the receptacle which is opposite said side-scraper, at a distance from the adjacent side of the receptacle to constitute a kneader.

2. A bread-mixer, comprising a receptacle, and a rotary stirrer-rod vertically journaled coaxially of the receptacle, a portion of said rod next to its vertical journal extending parallel and close to the side of the receptacle for constituting a side-scraper, and thence extending laterally parallel and close to the bottom to constitute a bottom-scraper, and thence extending upwardly at a distance from the opposite side of the receptacle to constitute a kneader, and terminating in a short lateral portion extending approximately to the side of the receptacle.

3. In a bread-mixer, the combination, with a receptacle, of a rotary stirrer-rod having its free end extending upwardly to constitute a kneader adapted to pass through the midst of the dough mass, said kneader having at its upper end an outwardly-bent dumper portion.

4. In a bread-mixer, the combination, with a receptacle, of a vertically-journaled stirrer-rod mounted therein, having a kneader portion extending upwardly in the midst of the receptacle at a considerable distance from the sides, the lower end of said kneader portion being connected directly to the journal end of the stirrer-rod, and the upper end of said kneader portion being separated by an open space from said journal end.

5. In a bread-mixer, the combination, with a receptacle, of a vertically-journaled stirrer-rod mounted therein, and terminating at one side of the receptacle in an upwardly-extending laterally-bent dumper for limiting the upward movement of the dough and aiding in turning it downward.

6. In a bread-mixer, the combination, with a receptacle, of a vertically-journaled stirrer-rod mounted therein, and having a laterally-bent dumper portion connected to the vertical journal end of the stirrer-rod by a part extending downwardly from said dumper portion and thence upwardly to said journal end.

In testimony whereof I have signed my name to this specification in the presence of two subscribing witnesses.

LOUIS LIBBMAN.

Witnesses:
GEO. H. MAXWELL,
M. A. JONES.